(Model.)

O. A. WILSON.
Knife.

No. 229,219. Patented June 22, 1880.

WITNESSES:
Henry N. Miller
C. Sedgwick

INVENTOR:
O. A. Wilson
BY Munn & Co
ATTORNEYS.

UNITED STATES PATENT OFFICE.

ORVILLE A. WILSON, OF BENNINGTON, NEW HAMPSHIRE, ASSIGNOR TO HIMSELF AND HARTWELL LAKIN, OF SAME PLACE.

KNIFE.

SPECIFICATION forming part of Letters Patent No. 229,219, dated June 22, 1880.

Application filed April 2, 1880. (Model.)

*To all whom it may concern:*

Be it known that I, ORVILLE A. WILSON, of Bennington, in the county of Hillsborough and State of New Hampshire, have invented a new and Improved Attachment for Knife Blades and Handles, of which the following is a specification.

The object of this invention is to provide a cheaper, stronger, and more durable fastening for uniting the handles and blades of knives and handles and tines of forks.

The invention consists in combining a slotted handle having beveled annular shoulder, a bolster, a blade with slotted tank, and a screw-bolt, as hereinafter described.

Figure 1:
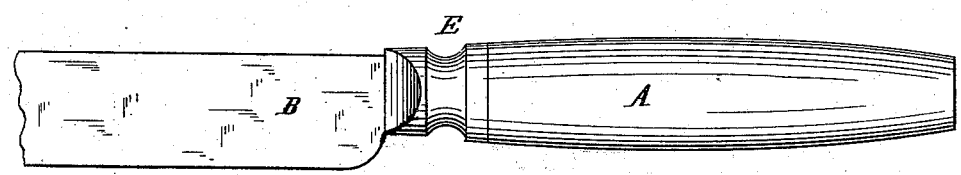
Figure 2:
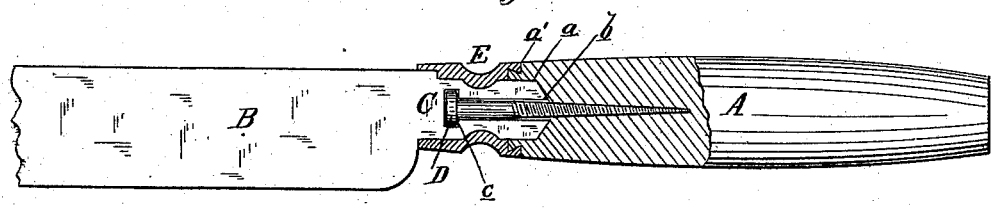
Figure 3:
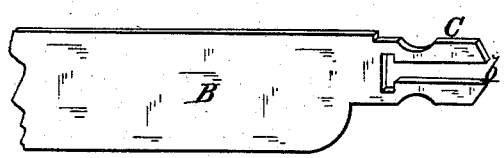
Figure 4:
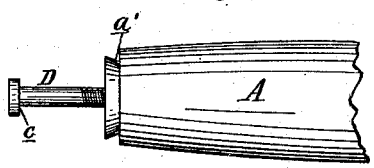
Figure 5:
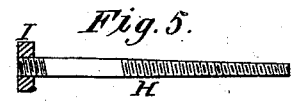
Figure 6:
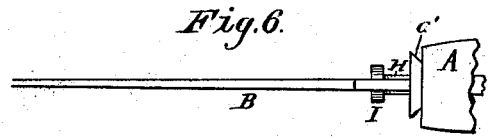

Figure 1 is a side elevation, showing a finished knife. Fig. 2 is a side elevation, partly in section, showing a knife partly finished. Fig. 3 is a side elevation of a knife-blade having a slotted tang. Fig. 4 is a side elevation, showing the screw-bolt in position in a knife-handle. Fig. 5 is a longitudinal elevation of a screw and nut. Fig. 6 is an edge view of a knife-blade section of handle and uniting-screw.

Similar letters of reference indicate corresponding parts.

In the drawings, A represents a knife-handle, provided with a slot, *a*, formed in its end for the reception of the tang, and having a beveled annular shoulder, *a'*, formed about its end.

B is the blade, provided with a tang, C, having a longitudinal central slot, *b*, corresponding with the shape of the shank and head of the screw-bolt D, which screw-bolt D is screwed centrally into the head of the handle A, so as to secure a firm hold therein and project from the said handle sufficiently to enter the slot *b* of the tang C.

In uniting the blade and handle to form the knife the screw-bolt D is first screwed into the handle A; then the operator takes the blade B and enters the end of the tang C into the slot *a* of the handle A, and then moves the said blade B sidewise, so that the slot *b* of the tang shall embrace the projecting shank and head of the said bolt D. Then, with pinchers or other suitable device, the head of the said screw-bolt D is seized and said bolt turned down farther into the end of the handle A to draw down the knife-blade B and hold it in position. Then a bolster-mold is fitted about the united handle and blade at their point of union and metal cast into the said mold to form the bolster E, which bolster E embraces the beveled annular shoulder *a'* of the handle A, the head or nut and upper portion of the shank of the bolt D, and the tang C, thereby uniting the handle and blade A and B; while the molten metal of this bolster E, flowing and cooling about the tang, bolt-head, or nut and shank, said bolt-head preferably having a square shoulder, as shown at *c*, and annular shoulder of the knife-handle, holds the parts securely together. It will be seen that these parts also serve to hold the bolster E firmly in place.

The usual method of securing blades and tines to handles of knives and forks is to bore a large hole longitudinally in the handle for the reception of the pointed tangs, and one or two transverse holes connecting therewith, and then, after placing the parts in a proper bolster-mold, to force the bolster metal by pressure about the tang and into the longitudinal hole about the tang and out of the transverse holes in the handle, in order to make a sufficiently strong union of the parts. This method consumes a large quantity of bolster metal and frequently makes imperfect work.

By my method the quantity of metal used for the bolster is but about one-half of that commonly used, and rarely or never are any knives or forks rejected on account of imperfect bolsters.

In large knives and forks the tang is made to enter the handle farther than in small knives and forks, to give increased strength, while in lighter knives and forks a sufficiently firm union of handle and blade is secured without entering the tang into the handle.

In Fig. 5 is shown a screw-bolt, H, provided with a nut, I, on its upper end. This screw and nut H I may be used, instead of the bolt D, to unite the handle of the knife or fork with the blade or tines thereof, the pointed end of the said screw entering the handle, and the larger end entering the slot in the tang, and the nut I being then turned down on said screw H to hold the tang and handle firmly together; and in Fig. 6 is shown a blade, B, and handle, A, united by means of screw-bolt H and nut I.

Having thus described my invention, I claim as new and desire to secure by Letters Patent—

The combination of the slotted handle A, having beveled annular shoulder $a'$, the bolster E, the blade B, having slotted tang C, and the screw-bolt D, the latter fitting blade-slot $b$ and screwing into handle, as shown and described.

ORVILLE A. WILSON.

Witnesses:
JOHN W. FLAGG,
CHARLES E. EATON.